United States Patent
Hua et al.

(10) Patent No.: US 8,335,270 B2
(45) Date of Patent: Dec. 18, 2012

(54) CHANNEL ESTIMATION METHOD OF AN ORTHOGONAL FREQUENCY DIVISION MULTIPLEXING SYSTEM AND RECEIVING APPARATUS

(75) Inventors: Meng Hua, Shanghai (CN); Gengshi Wu, Shanghai (CN); Bing Tang, Shanghai (CN); Shurong Jiao, Shanghai (CN)

(73) Assignee: Huawei Device Co., Ltd., Shenzhen (CN)

( * ) Notice: Subject to any disclaimer, the term of this patent is extended or adjusted under 35 U.S.C. 154(b) by 0 days.

(21) Appl. No.: 13/151,998

(22) Filed: Jun. 2, 2011

(65) Prior Publication Data

US 2011/0228868 A1    Sep. 22, 2011

Related U.S. Application Data

(63) Continuation of application No. PCT/CN2009/075006, filed on Nov. 18, 2009.

(30) Foreign Application Priority Data

Dec. 3, 2008    (CN) .......................... 2008 1 0178972

(51) Int. Cl.
*H04K 1/10*    (2006.01)
*H04J 3/12*    (2006.01)
(52) U.S. Cl. ........................................ 375/260; 370/527
(58) Field of Classification Search .................. 375/260, 375/343; 370/527
See application file for complete search history.

(56) References Cited

U.S. PATENT DOCUMENTS

| | | | |
|---|---|---|---|
| 7,933,349 B2 * | 4/2011 | Kawauchi et al. ............ | 375/260 |
| 2002/0086690 A1 * | 7/2002 | Takahashi et al. ............ | 455/502 |
| 2004/0095907 A1 * | 5/2004 | Agee et al. .................... | 370/334 |
| 2004/0246998 A1 * | 12/2004 | Ma et al. ........................ | 370/527 |
| 2005/0243939 A1 | 11/2005 | Jung et al. | |
| 2005/0249181 A1 * | 11/2005 | Vijayan et al. ................ | 370/344 |
| 2006/0187105 A1 * | 8/2006 | Sakata et al. .................. | 341/155 |
| 2006/0198472 A1 * | 9/2006 | Nakamura et al. ............ | 375/343 |
| 2007/0217441 A1 * | 9/2007 | Mudulodu et al. ............ | 370/437 |
| 2007/0280364 A1 * | 12/2007 | Adachi .......................... | 375/260 |
| 2008/0101490 A1 * | 5/2008 | Kawauchi et al. ............ | 375/260 |

FOREIGN PATENT DOCUMENTS

CN    1677970 A    10/2005
(Continued)

OTHER PUBLICATIONS

Office Action dated Dec. 19, 2011 in connection with European Patent Application No. EP 09 829 998.5.

(Continued)

*Primary Examiner* — David C. Payne
*Assistant Examiner* — Sarah Hassan

(57) ABSTRACT

A channel estimation method of an Orthogonal Frequency Division Multiplexing (OFDM) system and a corresponding receiving apparatus are provided. The technical solutions use the receiving apparatus to firstly perform channel estimation in time dimension on received signals, obtain channel information of pilot points from an effective sub-carrier frequency band on a frequency domain of each OFDM symbol, obtain information of the pilot points on frequency bands outside the effective sub-carrier frequency band by adding the information of the pilot points, and then perform Inverse Fast Fourier Transform (IFFT), windowing, zero-padding, and Fast Fourier Transform (FFT) to obtain a channel frequency response, so as to obtain a channel estimation result. The technical solutions can achieve goals of restraining an edge effect and improving accuracy of the channel estimation.

9 Claims, 7 Drawing Sheets

FOREIGN PATENT DOCUMENTS

| | | |
|---|---|---|
| CN | 101027882 A | 8/2007 |
| CN | 101267422 A | 9/2008 |
| CN | 101437010 A | 5/2009 |
| EP | 1 758 329 A1 | 2/2007 |
| EP | 1 968 268 A2 | 9/2008 |
| WO | WO 2008/016325 A2 | 2/2008 |

OTHER PUBLICATIONS

Jeong-Wook Seo, et al., "DFT-based PSA Channel Estimation Using Linear Prediction for OFDM Systems with Virtual Carriers", 2005 IEEE, p. 510-513.

Jeong-Wook Seo, et al., "An Enhanced DFT-Based Channel Estimation Using Virtual Interpolation With Guard Bands Prediction for OFDM", The 17th Annual IEEE International Symposium on Personal Indoor and Mobile Radio Communications (PIMRC'06), 2006, 5 pages.

Written Opinion of the International Searching Authority dated Feb. 11, 2010 in connection with International Patent Application No. PCT/CN2009/075006.

International Search Report dated Feb. 11, 2010 in connection with International Patent Application No. PCT/CN2009/075006.

* cited by examiner

CHANNEL ESTIMATION METHOD OF AN ORTHOGONAL FREQUENCY DIVISION MULTIPLEXING SYSTEM AND RECEIVING APPARATUS

CROSS-REFERENCE TO RELATED APPLICATIONS

This application is a continuation of International Application No. PCT/CN2009/075006, filed on Nov. 18, 2009, which claims priority to Chinese Patent Application No. 200810178972.4, filed on Dec. 3, 2008, both of which are hereby incorporated by reference in their entireties.

TECHNICAL FIELD

The present invention relates to the field of mobile communications technologies, and in particular, to a channel estimation method of an Orthogonal Fre+quency Division Multiplexing (OFDM) system and a receiving apparatus.

BACKGROUND

An OFDM technology is a high-speed multi-carrier transmission technology capable of effectively resisting Inter-Symbol Interference (ISI). Being different from a conventional frequency division multi-path transmission method, sub-carriers of an OFDM system are orthogonal to each other, so frequency spectra between sub-channels are allowed to be overlapped with each other, thereby maximizing the use of spectrum resources. The OFDM technology has been successfully applied to systems, such as an Asymmetric Digital Subscriber Line (ADSL), a Wireless Local Loop (WLL), a Digital Audio Broadcasting (DAB), a High-definition Television (HDTV), and a Wireless Local Area Network (WLAN). The application of the OFDM technology in the mobile communication is an irresistible trend.

Channel estimation is one of core technologies of the OFDM system. An existing channel estimation method of the OFDM system mainly includes linear interpolation channel estimation, Wiener filtering channel estimation, and Fast Fourier transform (FFT) interpolation channel estimation.

In terms of performance, the linear interpolation channel estimation is the worst; in terms of implementation complexity, the Wiener filtering channel estimation is more complex than the other two channel estimation methods, and has the largest operations; and the FFT channel estimation has the smaller operations and is relatively more simply implemented.

In the actual OFDM system, an OFDM symbol sent by a sending apparatus in a frequency band includes a plurality of sub-carriers bearing data and a plurality of pilot sub-carriers used for channel estimation. Frequency-domain sub-carriers of the OFDM system are usually placed at equal intervals. FIG. 1 is a distribution diagram of frequency-domain pilots obtained after a receiving apparatus performs channel estimation in time dimension on received signals. Assuming that a total number of sub-carriers of the OFDM symbol is Y, sequence numbers of the sub-carriers are [0, Y−1], an interval of adjacent pilot sub-carriers is P, and after the channel estimation in time dimension, a total number of the pilot sub-carriers in one OFDM symbol is N. The interval P of adjacent pilot sub-carriers is selected to guarantee that a frequency interval is less than channel coherent bandwidth, that is, to satisfy a sampling theorem, and in this way, an actual channel frequency response can be restored.

In fact, in the OFDM system, a bandwidth frequency band of each OFDM symbol also includes protection sidebands which are set zero. FIG. 2 is a schematic diagram of an OFDM symbol in a Long Time Evolution (LTE) system on bandwidth, in which the bandwidth occupied by the OFDM symbol includes 1024 sub-carriers. A total number of effective sub-carriers in the 1024 sub-carriers is 600. The 600 effective sub-carriers include sub-carriers bearing pilots and sub-carriers bearing data. The bandwidth occupied by the 600 effective sub-carriers may be 10 MHz. The 1024 sub-carriers of the OFDM symbol further include protection sidebands on both ends respectively occupying 212 sub-carriers and 211 sub-carriers. The 1024 sub-carriers of the OFDM symbol also include one Direct Current (DC) sub-carrier. When the FFT interpolation channel estimation is adopted, the channel estimation is performed according to information of the pilot sub-carriers in the 600 effective sub-carriers. The pilots just perform sampling on frequency bands occupied by the effective sub-carriers of the OFDM symbol instead of performing sampling on frequency bands occupied by the whole OFDM symbol including the protection sidebands. Therefore, a large error exists between the channel obtained through the FFT interpolation channel estimation method and the actual channel. The error is relatively smaller at an intermediate frequency point, but is larger at edge frequency points on the both ends, and for ease of description, the phenomenon is called an edge effect.

In the process of researching and practicing the prior art, the inventors of the present invention find that adoption of the FFT interpolation channel estimation method causes a large error of the channel estimation, and in particular, causes a large error at edge frequency points of bandwidth of an OFDM symbol.

SUMMARY

Embodiments of the present invention provide a channel estimation method of an OFDM system and a receiving apparatus, so as to solve a defect of a large error of channel estimation caused by an edge effect of an OFDM symbol in the channel estimation of the OFDM system.

According to the first aspect of the present invention a channel estimation method of an OFDM system includes:
  receiving signals sent by a sending apparatus;
  performing channel estimation in time dimension on the signals;
  obtaining pilot signals from an effective sub-carrier frequency band on bandwidth of an OFDM symbol obtained after the channel estimation;
  adding channel information of pilot points on frequency bands outside the effective sub-carrier frequency band on the bandwidth of the OFDM symbol according to the obtained pilot signals;
  performing Inverse Fast Fourier Transform (IFFT) on the obtained pilot signals and the added channel information of the pilot points;
  windowing a time-domain response obtained after the IFFT according to preset windowing information;
  zero-padding the windowed time-domain response according to a number of sub-carriers of the OFDM symbol;
  performing FFT on the zero-padded time-domain response; and
  obtaining a channel frequency response with a length being a number of effective sub-carriers in the effective sub-carrier frequency band from the channel frequency response obtained after the FFT.

According to the second aspect of the present invention a receiving apparatus includes:

a receiving unit, configured to receive signals sent by a sending apparatus;

a time-domain estimation unit, configured to perform channel estimation in time dimension on the signals;

a pilot extracting unit, configured to obtain pilot signals from an effective sub-carrier frequency band on bandwidth of an OFDM symbol obtained after the channel estimation;

a pilot adding unit, configured to add channel information of pilot points on frequency bands outside the effective sub-carrier frequency band on the bandwidth of the OFDM symbol according to the obtained pilot signals;

an IFFT unit, configured to perform IFFT on the obtained pilot signals and the added channel information of the pilot points;

a time-domain windowing unit, configured to window a time-domain response obtained after the IFFT according to preset windowing information;

a zero-padding unit, configured to zero-pad the windowed time-domain response according to a number of sub-carriers of the OFDM symbol;

an FFT unit, configured to perform FFT on the zero-padded time-domain response; and an obtaining unit, configured to obtain a channel frequency response with a length being a number of effective sub-carriers in the effective sub-carrier frequency band from the channel frequency response obtained after the FFT.

In the embodiments of the present invention, the receiving apparatus is adopted to perform the channel estimation in the time dimension on the received signals, obtain the information of the pilot points from the effective sub-carrier frequency points on the frequency domain of each OFDM symbol, obtain the information of the pilot points outside the effective sub-carrier frequency band by adding the information of the pilot points, and then perform the IFFT, the windowing, the zero-padding, and the FFT to obtain the channel frequency response, so as to obtain a channel estimation result. Because the number of the pilot points is increased, goals of restraining the edge effect and improving the accuracy of the channel estimation are achieved.

DETAILED DESCRIPTION

An embodiment of the present invention provides a channel estimation method of an OFDM system. A further embodiment of the present invention provides a corresponding receiving apparatus. Detailed descriptions are given respectively in the following.

Embodiment 1

Figure 3:
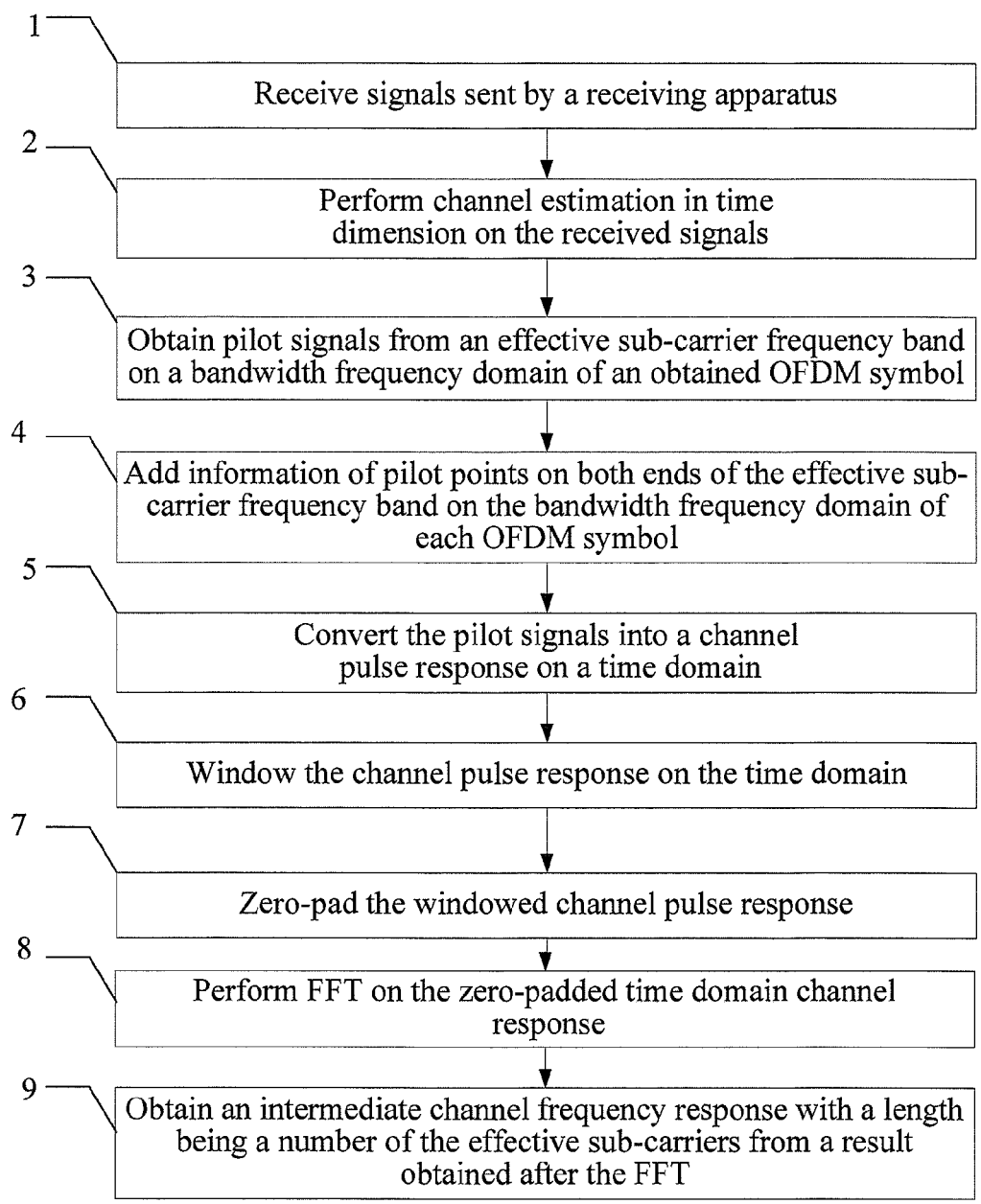
FIG. 3 is a schematic simplified flow chart of a channel estimation method of an OFDM system according to a first embodiment of the present invention.

This embodiment provides a channel estimation method of an OFDM system. Referring to FIG. 3, the method includes the following blocks.

Block 1: A receiving apparatus receives signals sent by a sending apparatus.

When the signals sent by the sending apparatus are transmitted through a medium usually being air, the signals received by the receiving apparatus in block 1 are modified. Therefore, to successfully demodulate and decode the received signals, the receiving apparatus is required to estimate a condition of a wireless channel, in which the condition of the wireless channel is usually represented by a pulse response or a transfer function of the wireless channel.

Block 2: The receiving apparatus performs channel estimation in time dimension on the received signals.

The channel estimation in time dimension on the received signals performed by the receiving apparatus in block 2 may use a linear channel estimation method or a Wiener filtering channel estimation method in the prior art. A specific operation of the channel estimation in time dimension on the signals may refer to the prior art.

Block 3: The receiving apparatus obtains pilot signals from an effective sub-carrier frequency band on bandwidth of an OFDM symbol obtained after the channel estimation in time dimension, that is, performs pilot extraction on frequency-domain signals obtained after the channel estimation in time dimension.

Figure 1:
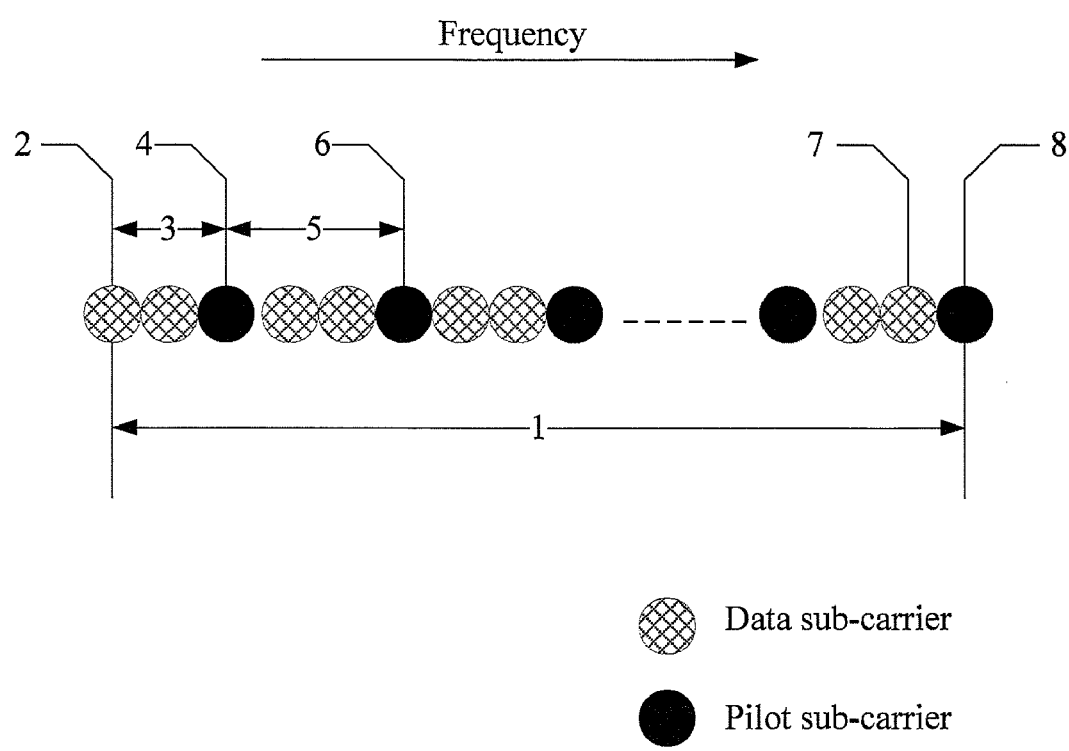
FIG. 1 is a schematic distribution diagram of sub-carriers on bandwidth frequency of an OFDM symbol, in which the frequency sub-carriers of the OFDM symbol include pilot sub-carriers and data sub-carriers, in the drawing, black circles represent the pilot sub-carriers, and circles having lines represent the data sub-carriers, assuming that in the OFDM symbol, a number of the pilot sub-carriers is N, 1 represents a frequency domain of the OFDM, 2 represents a position of a $0^{th}$ data sub-carrier, 3 represents an offset of a position of a $0^{th}$ pilot sub-carrier relative to a $0^{th}$ data sub-carrier, 4 represents the position of the $0^{th}$ pilot sub-carrier, 5 represents a frequency-domain interval of the pilot sub-carriers, 6 represents a position of a $1^{st}$ pilot sub-carrier, 7 represents an inverse $0^{th}$ data sub-carrier, and 8 represents an $(N-1)^{th}$ pilot sub-carrier.
Figure 2:
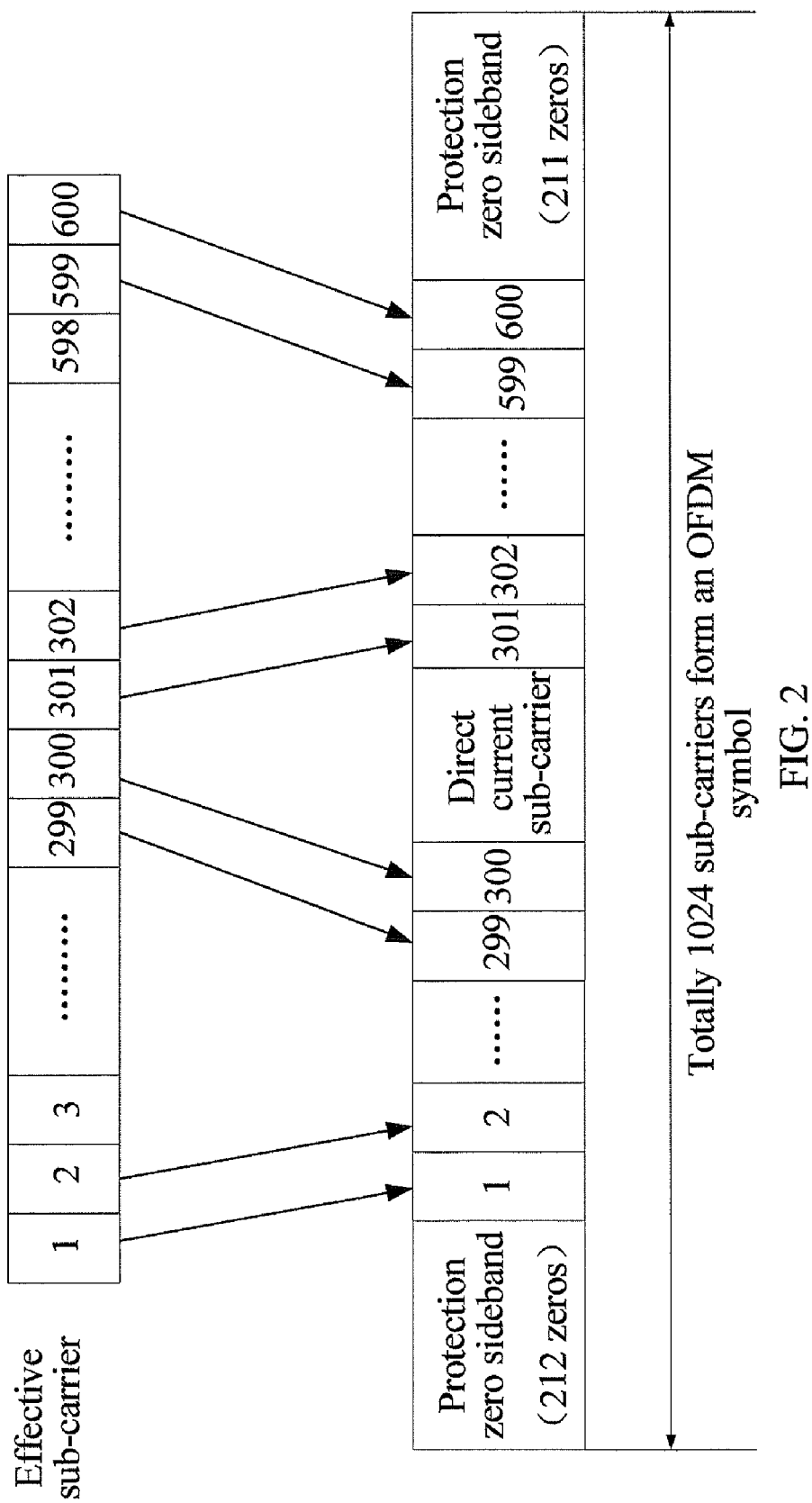
FIG. 2 is a schematic diagram of composition of an OFDM symbol on bandwidth in the prior art.

To facilitate understanding, signals after the pilot extraction on a frequency domain may be regarded as H (n). A variable n represents a number of pilots. Assuming that a number of pilot points on the bandwidth of one OFDM symbol is N, the N pilot points are 3 times down-sampling points of the OFDM symbol on the bandwidth, still referring to FIG. 1. It should also be understood that in the whole text, both the pilot signals and pilot information can be likewise understood as channel information of the pilot points.

Block 4: The receiving apparatus adds information of the pilot points on frequency bands at both edges on the bandwidth of the OFDM symbol according to the obtained pilot signals.

Figure 4:
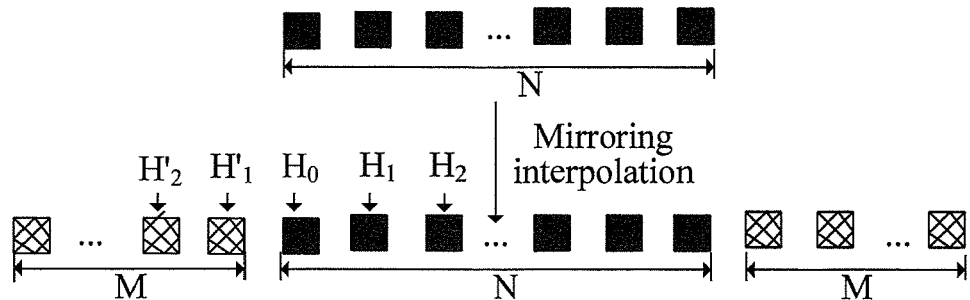
FIG. 4 is a schematic diagram of distribution of all pilots after mirroring pilot points according to the first embodiment of the present invention.

In block 4, the adding the information of the pilot points on the frequency bands at the both edges outside the effective sub-carrier frequency band on the bandwidth of each OFDM symbol actually equals to extending the effective sub-carrier frequency band on the bandwidth of each OFDM symbol. An optimized method of adding the information of the pilot points is that M pilot points in the effective sub-carrier frequency band are mirrored by using two pilot pilots of outermost ends of the effective sub-carrier frequency band on the bandwidth of each OFDM symbol as a "mirror", in which channel information of the mirrored pilot points and channel information of the pilot points in the effective sub-carrier frequency band have a linear relationship. It should also be understood that a value of M is selected according to different design (optimization) requirements in the field. The method can be simply called "frequency-domain mirroring interpolation". Referring to FIG. 4, assuming that a number of the pilot points on the bandwidth of one OFDM symbol which are received by the receiving apparatus is N, the receiving apparatus mirrors the pilot points on both ends of the effective sub-carrier frequency band, and obtains information of N+2M pilot points. The added channel information of the pilot points is linear, that is, $H'_1=2H_0-H_1$ and $H'_2=2H_0-H_2'$ and so forth. It may be regarded that the channel information of the pilot points obtained by the receiving apparatus at; this moment is H'(m). It should be understood that the channel information of the pilot points obtained by the receiving apparatus include the channel information of the pilot points obtained in block 3 and block 4.

Block 5: Convert the pilot signals on the frequency domain obtained in block 3 and block 4 into a channel response on a time domain, that is, perform IFFT on the H'(m) to obtain a channel pulse response h'(m) on the time domain.

Block 6: The receiving apparatus windows the channel pulse response h'(m) on the time domain according to preset windowing information.

The preset windowing information used in block 6 may be specifically a width of windowing the channel pulse response h'(m) on the time domain. To facilitate understanding, the windowing can be understood as a product of the channel pulse response h'(m) on the time domain and a rectangular function with an amplitude being 1, and a length of the rectangular function is a length of windowing the pulse response h'(m). Assuming that a preset windowing length of the receiving apparatus is L, and the value of L is an actual length of a channel assumed by the receiving apparatus. By windowing the pulse response h'(m), the receiving apparatus reserves multi-path information of the channel, and filters noises outside the channel at the same time.

A specific operation of obtaining the windowing length L by the receiving apparatus may be that when the receiving apparatus does not know a type of the channel or the channel changes constantly, the receiving apparatus estimates a multi-path delay, and obtains the length L according to an estimation result of the multi-path delay.

Figure 5:
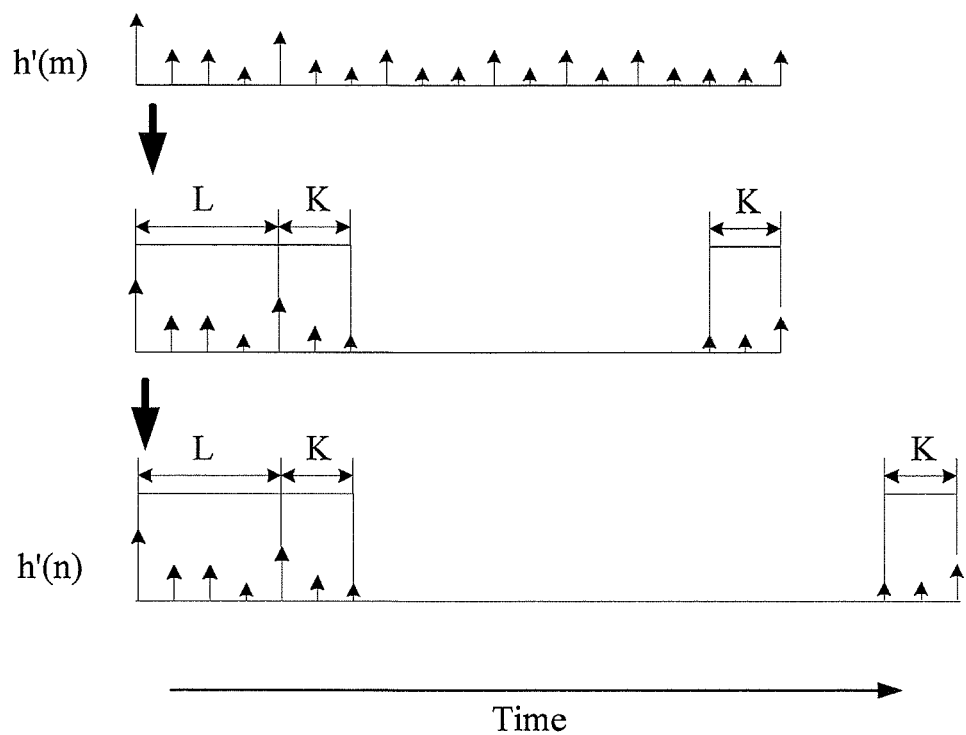
FIG. 5 is a schematic simplified diagram of signals before and after windowing and zero-padding time-domain signals according to the first embodiment of the present invention.

It should also be noted that the preset windowing information in the receiving apparatus can also include two windows with the length being K. FIG. 5 illustrates the channel pulse response before and after the windowing. The reason for adding the two windows with the length being K is that the N+2M pilots sequence is not the actual channel frequency response, the actual channel frequency response should be the frequency response of all sub-carriers of the OFDM symbol, and the N+2M pilots sequence is a product of 3 times down-sampling points of the actual channel frequency response and a rectangular function with the length being N+2M. Therefore, the channel pulse response h'(m) obtained after the IFFT performed on the N+2M pilot points is not the actual channel pulse response. The rectangular function on the frequency domain becomes a Sin c function after the IFFT. A convolution of the actual channel pulse response and the Sin c function on the time domain can be equivalent to adding a window with a length being L, and adding a rectangular window with a length being K or a triangular window with a length being K to the channel pulse response h'(m). Therefore, the windowing length being L is for the purpose of reserving multi-path information of the channel, and the windowing length being K is for the purpose of reserving a "derivative path" generated after the convolution of the actual channel pulse response and the Sin c function on the time domain. A specific length of K may be a value measured through emulation, and is adjustable.

Block 7: The receiving apparatus zero-pads the windowed channel pulse response h'(m), so as to enable the length of the sequence to be the length of the OFDM symbol after the IFFT on the bandwidth, that is, the zero-padded time-domain channel response is h'(n).

The length of the OFDM symbol on the bandwidth includes the frequency band occupied by effective sub-carriers and the frequency band occupied by protection sidebands. A specific position of the zero-padding performed by the receiving apparatus is a position between two groups of time-domain signals with the length being L+K and the length being K obtained after the windowing.

Block 8: The receiving apparatus performs FFT on the zero-padded time-domain channel response.

Block 9: Obtain an intermediate channel frequency response with a length being a number of the effective sub-carriers, that is, obtain a middle 3N length part of the channel frequency response from a result obtained after the FFT in block 8.

After the FFT in block 8, the channel frequency response of the OFDM symbol on the bandwidth is obtained. In fact, it has been explained that both ends of the OFDM symbol on the bandwidth usually have no pilot signal, but have the protection sidebands. Therefore, the channel frequency response obtained in block 9 is the more accurate channel estimation in the effective sub-carrier frequency band on the bandwidth of one OFDM symbol.

Figure 6:
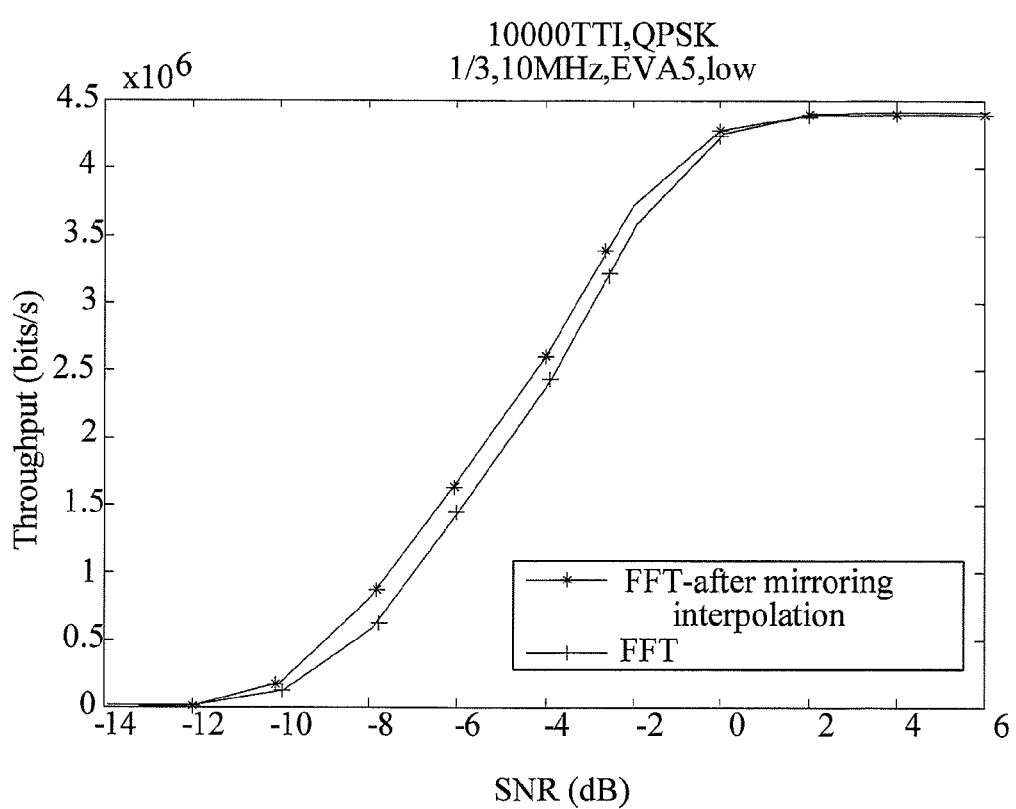
FIG. 6 is a comparison diagram of emulation results obtained by using the method according to the first embodiment of the present invention and by using a method in the prior art respectively.

Block 2 is the channel estimation in the time dimension performed by the receiving apparatus; and the explanation of block 3 to block 9 is the channel estimation in the frequency domain performed by the receiving apparatus. FIG. 6 illustrates a comparison of a channel estimation result of an OFDM system obtained by using a channel estimation method of the OFDM system according to an embodiment of the present invention and a channel estimation result in the prior art. In the drawing, 10000TTI represents a length of emulation time, each TTI is 1 ms, that is, the emulation time is 1 ms×10000=10 s. Quadrature Phase Shift Keying (QPSK) represents that a modulation manner is QPSK, ⅓ represents a coding rate, 10 MHz represents bandwidth of the system, low represents that the relevancy of two receiving antennas is low, EVA5 represents that an adopted fading channel model is an EVA model, and 5 represents a maximum Doppler frequency.

In the description of the channel estimation method of the OFDM system according to this embodiment, the receiving apparatus performs the channel estimation in the time dimension on the received signals, obtains the information of the pilot points from effective sub-carrier frequency points on the frequency domain of each OFDM symbol, obtains the information of the pilot points outside the effective sub-carrier frequency band by adding the information of the pilot points, and then performs the IFFT, the windowing, the zero-padding, and the FFT to obtain the channel frequency response. A defect of a large error in the channel estimation caused by the edge effect is effectively restrained, and the noises in the channel can be filtered by using the windowing technology at the same time, thereby improving the accuracy of the channel estimation.

Embodiment 2

This embodiment provides a channel estimation method of an OFDM system, and the method is similar to the channel estimation method of the OFDM system according to the first embodiment in implementation. The embodiment is a more specific execution method of the method according to the first embodiment. This embodiment is mainly explained according to a processing operation procedure of frequency-domain signals as shown in FIG. 7.

Figure 7:
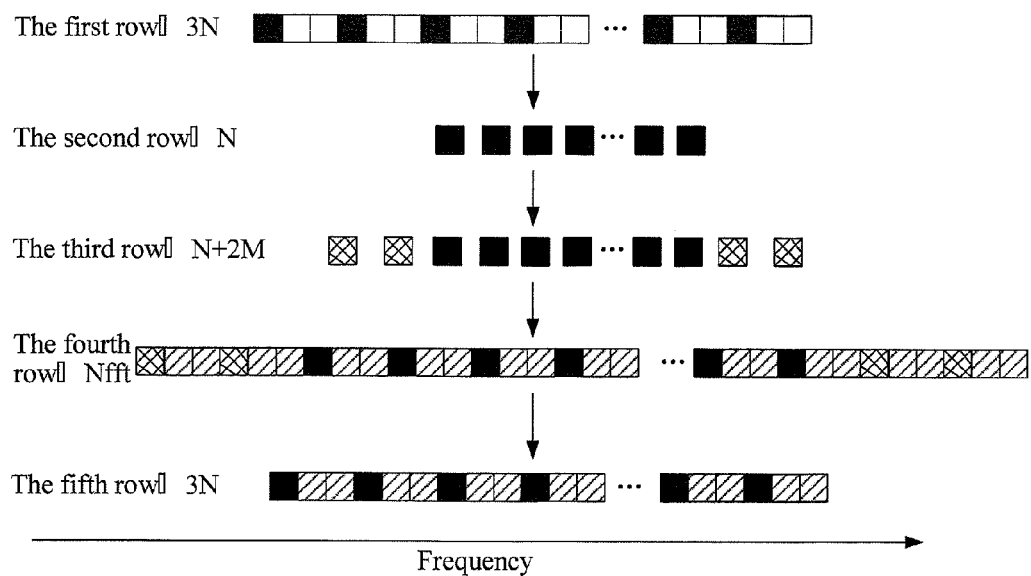
FIG. 7 is a schematic simplified diagram of changes of frequency-domain signals according to a second embodiment of the present invention.

Referring to FIG. 7, a receiving apparatus performs channel estimation in time dimension on received signals, and extracts pilots on bandwidth of an OFDM symbol obtained after the channel estimation in the time dimension. The first row in the FIG. 7 represents a distribution condition of pilot points and frequency points bearing data on the bandwidth of the OFDM symbol, the pilot points are 3 times down-sampling points of the OFDM symbol on the bandwidth. It should be explained that the distribution of the pilot points satisfies a sampling theorem.

The receiving apparatus extracts the pilots and obtains a frequency response of the pilots, such as N pilots as shown in the second row of FIG. 7. It should be understood that the channel estimation of the OFDM system is that a channel frequency response on non-pilot points bearing data is obtained according to the obtained frequency response of the pilots.

The receiving apparatus adds pilots according to the obtained pilot points. A specific adding method is to mirror two pilot points of the outermost ends of the obtained pilot points on effective sub-carriers of the OFDM symbol. As shown in the third row of FIG. 7, two pilot points are mirrored from the both ends. The receiving apparatus performs IFFT on the frequency response of all obtained pilot points and windows the obtained time-domain pulse response. A specific windowing method may be that windows with lengths being L+K and K respectively in FIG. 5 are added to the obtained time-domain pulse response according to a length of a multi-path of an actual channel pre-obtained by the receiving apparatus and "derivative path" information generated by converting frequency-domain signals into time-domain signals.

The receiving apparatus zero-pads between the obtained L+K window and K window, so as to enable a length of a time-domain channel to reach a length of the OFDM symbol on the frequency domain. The FFT is performed on a time-domain response obtained after the time domain zero-padding, and an unsampled frequency response of the OFDM symbol on the bandwidth is obtained. As shown in the fourth row in FIG. 7, the receiving apparatus obtains channel frequency responses on all the pilot points and the effective sub-carriers.

Because protection sidebands are provided at frequencies on both ends of the OFDM symbol on the bandwidth, the channel estimation should be channel estimation on frequency bands where the effective sub-carriers are located. Referring to the fifth row of the FIG. 7, the channel response on the frequency domain where the effective sub-carriers are located is obtained from the bandwidth of the OFDM symbol, that is, a channel estimation result of the OFDM system.

In the description of the channel estimation method of the OFDM system according to this embodiment, the receiving apparatus performs the channel estimation in the time dimension on the received signals, obtains the information of the pilot points from effective sub-carrier frequency points on the frequency domain of each OFDM symbol, obtains the information of the pilot points outside the effective sub-carrier frequency band by adding the information of the pilot points, and then performs the IFFT, the windowing, the zero-padding, and the FFT to obtain the channel frequency response. A defect of a large error in the channel estimation caused by the edge effect is effectively restrained, and the noises in the channel can be filtered by using the windowing technology at the same time, thereby improving the accuracy of the channel estimation.

Embodiment 3

Figure 8:
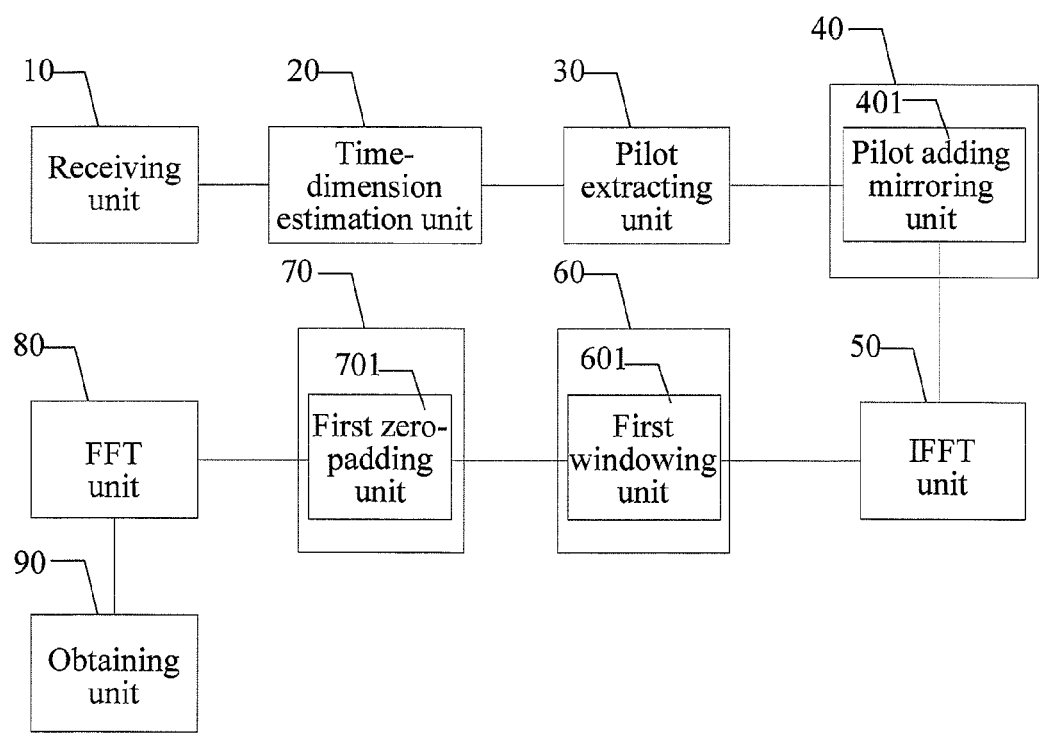
FIG. 8 is a schematic simplified logic diagram of a receiving apparatus according to a third embodiment of the present invention.

This embodiment provides a receiving apparatus. Referring to FIG. 8, the apparatus includes a receiving unit 10, a time-domain estimation unit 20, a pilot extracting unit 30, a pilot adding unit 40, an IFFT unit 50, a time-domain windowing unit 60, a zero-padding unit 70, an FFT unit 80, and an obtaining unit 90.

The receiving unit 10 is configured to receive signals sent by a sending apparatus, in which the receiving unit 10 may specifically be a receiving antenna; the time-domain estimation unit 20 is configured to perform channel estimation in time dimension on the received signals received by the receiving unit 10, in which a specific estimation method may use a linear channel estimation method or a Wiener filtering channel estimation method in the prior art; the pilot extracting unit 30 is configured to obtain an OFDM symbol after the channel estimation in the time dimension performed by the time-domain estimation unit 20, and obtain pilot information in an effective sub-carrier frequency band on bandwidth of the OFDM symbol, that is, extract pilot signals.

The pilot adding unit 40 is configured to add new information of pilot points, that is, add the pilot signal, according to the pilot signals obtained by the pilot extracting unit 30. The pilot adding unit 40 may include a pilot adding mirroring unit 401, configured to mirror M pilot points in the effective sub-carrier frequency band by using two pilot points of outermost ends of the effective sub-carrier frequency band as a "mirror", that is, mirror the M pilot points in the effective sub-carrier frequency band by using the two pilot points of the outermost ends of the effective sub-carrier frequency band on the bandwidth of each OFDM symbol as the "mirror". The M pilot points in the effective sub-carrier frequency band may be sequential from the first to the $M^{th}$ pilot points with the mirror pilot point being the $0^{th}$ pilot point. Operations executed by the pilot adding mirroring unit 401 may be simply called "frequency domain mirroring interpolation". Channel information of the pilot points added by the pilot adding mirroring unit 401 may have a linear relationship with the channel information of the pilot points in the effective sub-carriers.

The IFFT unit 50 is configured to perform IFFT on all the obtained pilot signals to obtain a channel pulse response on a time domain; and the time-domain windowing unit 60 is configured to window the channel pulse response on the time domain obtained by the IFFT unit 50 according to preset windowing information, in which the preset windowing information includes a length L of a pre-obtained actual channel, and the windowing length is L. Therefore, multi-path information of the channel is reserved, and noises outside the channel are filtered at the same time.

The time-domain windowing unit 60 may include a first windowing unit 601, configured to add windows with lengths being L+K and K to a time-domain response obtained after the IFFT according to information of preset windowing lengths being respectively L and K, in which the window with the length being K includes a rectangular window with the length being K or a triangular window with the length being K. The explanation of adding the rectangular window or triangular window with the length being K may refer to the explanation relevant to the windowing information in the first embodiment.

The zero-padding unit 70 is configured to zero-pad the channel pulse response obtained after the windowing, so as to enable a length of a sequence to be a length of each OFDM symbol after the IFFT on the frequency domain. The zero-padding unit 70 may include a first zero-padding unit 701, configured to zero-pad between two groups of time-domain signals with the lengths being L+K and K obtained after the windowing according to a number of sub-carriers of the OFDM symbol.

The FFT unit 80 is configured to perform FFT on the zero-padded channel pulse response to obtain a channel frequency response of one OFDM symbol on the bandwidth; and the obtaining unit 90 is configured to obtain a channel frequency response in the intermediate effective sub-carrier frequency band, in which the channel frequency response is a result of the channel estimation performed by the receiving apparatus in the OFDM system. The receiving apparatus may further demodulate or decode the received signals according to the obtained channel estimation result.

In the description of the receiving apparatus according to this embodiment, the receiving apparatus performs the channel estimation in the time dimension on the received signals, obtains the information of the pilot points from effective sub-carrier frequency points on the bandwidth of each OFDM symbol, obtains the information of the pilot points outside the effective sub-carrier frequency band by adding the information of the pilot points, and then performs the IFFT, the windowing, the zero-padding, and the FFT to obtain the channel frequency response. A defect of a large error in the channel estimation caused by the edge effect is effectively restrained, and the noises in the channel can be filtered by using the windowing technology at the same time, thereby improving the accuracy of the channel estimation.

Persons of ordinary skill in the art should understand that all or a part of the steps of each method according to the embodiments may be completed by a program instructing relevant hardware. The program may be stored in a computer readable storage medium. The storage medium may be a ROM, a RAM, a magnetic disk, and an optical disk.

The channel estimation method of the OFDM system and the receiving apparatus according to the embodiments of the present invention are introduced in detail. The implementation of the present invention is described herein through specific examples. The description about the embodiments is merely provided for ease of understanding of the method. Persons of ordinary skill in the art can make variations and modifications to the present invention in terms of the specific implementations and application scopes according to the ideas of the present invention. Therefore, the specification shall not be construed as a limit to the present invention.

What is claimed is:

1. A channel estimation method of an Orthogonal Frequency Division Multiplexing (OFDM) system, the method comprising:
   receiving signals sent by a sending apparatus;
   performing channel estimation in time dimension on the signals;
   obtaining pilot signals from an effective sub-carrier frequency band on bandwidth of an OFDM symbol obtained after the channel estimation;
   adding channel information of pilot points on frequency bands outside the effective sub-carrier frequency band on the bandwidth of the OFDM symbol according to the obtained pilot signals;
   performing Inverse Fast Fourier Transform (IFFT) on the obtained pilot signals and the added channel information of the pilot points;
   windowing a time-domain response obtained after the IFFT according to preset windowing information;
   zero-padding the windowed time-domain response according to a number of sub-carriers of the OFDM symbol;
   performing Fast Fourier Transform (FFT) on the zero-padded time-domain response; and
   obtaining a channel frequency response with a length being a number of effective sub-carriers in the effective sub-carrier frequency band from the channel frequency response obtained after the FFT.

2. The method according to claim 1, wherein the adding the channel information of the pilot points on the frequency bands outside the effective sub-carrier frequency band on the bandwidth of the OFDM symbol according to the obtained pilot signals comprises:
   mirroring M pilot points in the effective sub-carrier frequency band by using two pilot points of outermost ends of the effective sub-carrier frequency band as a "mirror".

3. The method according to claim 2, wherein channel information of the mirrored pilot points and the channel information of the pilot points in the effective sub-carrier frequency band have a linear relationship.

4. The method according to claim 1, wherein the windowing the time-domain response obtained after the IFFT according to the preset windowing information comprises:
   adding windows with lengths being L+K and K to the time-domain response obtained after the IFFT according to information of preset windowing lengths being respectively L and K,
   wherein the added window with the length being K comprises a rectangular window with the length being K or a triangular window with the length being K.

5. The method according to claim 4, wherein the zero-padding the windowed time-domain response according to the number of the sub-carriers of the OFDM symbol comprises:
   zero-padding between two groups of time-domain signals with lengths being L+K and K obtained after the windowing according to the number of the sub-carriers of the OFDM symbol.

6. A receiving apparatus, comprising:
   a receiving unit, configured to receive signals sent by a sending apparatus;
   a time-domain estimation unit, configured to perform channel estimation in time dimension on the signals;
   a pilot extracting unit, configured to obtain pilot signals from an effective sub-carrier frequency band on bandwidth of an Orthogonal Frequency Division Multiplexing (OFDM) symbol obtained after the channel estimation;
   a pilot adding unit, configured to add channel information of pilot points on frequency bands outside the effective sub-carrier frequency band on the bandwidth of the OFDM symbol according to the obtained pilot signals;
   an Inverse Fast Fourier Transform (IFFT) unit, configured to perform IFFT on the obtained pilot signals and the added channel information of the pilot points;
   a time-domain windowing unit, configured to window a time-domain response obtained after the IFFT according to preset windowing information;

a zero-padding unit, configured to zero-pad the windowed time-domain response according to a number of sub-carriers of the OFDM symbol;

a Fast Fourier Transform (FFT) unit, configured to perform FFT on the zero-padded time-domain response; and an obtaining unit, configured to obtain a channel frequency response with a length being a number of effective sub-carriers in the effective sub-carrier frequency band from the channel frequency response obtained after the FFT.

7. The receiving apparatus according to claim 6, wherein the pilot adding unit comprises:

a pilot adding mirroring unit, configured to mirror M pilot points in the effective sub-carrier frequency band by using two pilot pilots of outermost ends of the effective sub-carrier frequency band as a "mirror", wherein channel information of the mirrored pilot points and the channel information of the pilot points in the effective sub-carrier frequency band have a linear relationship.

8. The receiving apparatus according to claim 6, wherein the time-domain windowing unit comprises:

a first windowing unit, configured to add windows with lengths being L+K and K to the time-domain response obtained after the IFFT according to information of pre-set windowing lengths being respectively L and K, wherein the added window with the length being K comprises a rectangular window with the length being K or a triangular window with the length being K.

9. The receiving apparatus according to claim 8, wherein the zero-padding unit comprises:

a first zero-padding unit, configured to zero-pad between two groups of time-domain signals with lengths being L+K and L obtained after the windowing according to the number of the sub-carriers of the OFDM symbol.

\* \* \* \* \*